(12) United States Patent
Ding et al.

(10) Patent No.: US 8,752,325 B2
(45) Date of Patent: Jun. 17, 2014

(54) ADAPTER

(75) Inventors: Tai-Lai Ding, Northville, MI (US); Youjin Wu, Westland, MI (US)

(73) Assignee: Leapers, Inc., Livonia, MI (US)

( * ) Notice: Subject to any disclaimer, the term of this patent is extended or adjusted under 35 U.S.C. 154(b) by 0 days.

(21) Appl. No.: 13/275,070

(22) Filed: Oct. 17, 2011

(65) Prior Publication Data

US 2013/0047486 A1    Feb. 28, 2013

Related U.S. Application Data

(60) Provisional application No. 61/527,311, filed on Aug. 25, 2011.

(51) Int. Cl.
  *F41G 1/38* (2006.01)
  *F41G 11/00* (2006.01)

(52) U.S. Cl.
  USPC ...................... 42/90; 42/85; 42/124

(58) Field of Classification Search
  USPC ............... 42/124, 125, 126, 127, 128, 85, 90; 89/37.03, 37.04
  See application file for complete search history.

(56) References Cited

U.S. PATENT DOCUMENTS

| | | | | |
|---|---|---|---|---|
| 3,877,166 A * | 4/1975 | Ward | ............................. | 42/127 |
| 4,383,371 A * | 5/1983 | Coffey | ............................. | 42/124 |
| 4,845,871 A | 7/1989 | Swan | | |
| 5,142,806 A | 9/1992 | Swan | | |
| 5,155,915 A * | 10/1992 | Repa | ............................. | 42/127 |
| 5,276,988 A * | 1/1994 | Swan | ............................. | 42/127 |
| 5,375,361 A * | 12/1994 | Rustick | ............................. | 42/125 |
| 5,396,725 A * | 3/1995 | Talbot | ............................. | 42/127 |
| 5,570,529 A * | 11/1996 | Amelino | ............................. | 42/124 |
| 5,606,818 A * | 3/1997 | Hardee | ............................. | 42/124 |
| 5,694,712 A * | 12/1997 | Plonka | ............................. | 42/124 |
| 5,941,489 A | 8/1999 | Fanelli et al. | | |
| 6,000,667 A * | 12/1999 | Isbell et al. | ............................. | 248/201 |
| D429,790 S * | 8/2000 | Plonka | ............................. | D22/110 |
| 6,449,893 B2 | 9/2002 | Spinner | | |
| D477,650 S * | 7/2003 | Rubin et al. | ............................. | D22/110 |
| 6,606,813 B1* | 8/2003 | Squire et al. | ............................. | 42/90 |
| 6,922,934 B1* | 8/2005 | Huan | ............................. | 42/127 |
| 7,107,716 B1* | 9/2006 | Liao | ............................. | 42/108 |
| D548,811 S | 8/2007 | Swan | | |

(Continued)

FOREIGN PATENT DOCUMENTS

| | | |
|---|---|---|
| DE | 8427339 U1 | 2/1985 |
| DE | 4133932 A1 | 4/1993 |
| DE | 19741753 A1 | 4/1999 |
| DE | 202004003173 U1 | 8/2004 |

*Primary Examiner* — Bret Hayes
*Assistant Examiner* — Derrick Morgan
(74) *Attorney, Agent, or Firm* — Honigman Miller Schwartz and Cohn LLP

(57) ABSTRACT

An apparatus is disclosed. The apparatus includes an adapter including a first body and a second body. A lower surface profile of the first body and the second body cooperate to form a first geometric mounting profile. An upper surface profile of the first body and the second body cooperate to form a second geometric mounting profile. The first geometric mounting profile is different from the second geometric mounting profile. Each of the first body and the second body forms at least one first aligned bore that receives a first fastener that connects the first body to the second body and a spring that biases the first body and the second body away from one another. An assembly is also disclosed. A method is also disclosed.

31 Claims, 6 Drawing Sheets

(56) References Cited

U.S. PATENT DOCUMENTS

| | | | |
|---|---|---|---|
| 7,421,818 B2* | 9/2008 | Houde-Walter | 42/146 |
| 7,685,758 B2* | 3/2010 | Romer | 42/124 |
| 7,739,824 B1* | 6/2010 | Swan | 42/124 |
| 7,743,547 B2 | 6/2010 | Houde-Walter | |
| 7,905,045 B1* | 3/2011 | Swan | 42/127 |
| D637,260 S | 5/2011 | Swan | |
| 1,016,225 A1 | 7/2011 | Houde-Walter | |
| 8,215,046 B2* | 7/2012 | Chvala | 42/71.01 |
| 8,240,075 B1* | 8/2012 | Mullin | 42/125 |
| 8,393,105 B1* | 3/2013 | Thummel | 42/90 |
| 2001/0022044 A1* | 9/2001 | Spinner | 42/124 |
| 2004/0000083 A1* | 1/2004 | Grant, Jr. | 42/112 |
| 2004/0016169 A1* | 1/2004 | Poff, Jr. | 42/124 |
| 2005/0039369 A1* | 2/2005 | Wilson | 42/124 |
| 2006/0179702 A1* | 8/2006 | York | 42/122 |
| 2007/0169393 A1* | 7/2007 | Frost | 42/124 |
| 2007/0266611 A1* | 11/2007 | Stover | 42/124 |
| 2008/0178511 A1* | 7/2008 | Storch et al. | 42/90 |
| 2008/0216380 A1* | 9/2008 | Teetzel | 42/127 |
| 2009/0064562 A1* | 3/2009 | Casas Salva | 42/124 |
| 2010/0107467 A1* | 5/2010 | Samson et al. | 42/127 |
| 2010/0186278 A1* | 7/2010 | Daniel | 42/71.01 |
| 2011/0067287 A1* | 3/2011 | Collin et al. | 42/119 |
| 2011/0100203 A1* | 5/2011 | Genes et al. | 89/9 |
| 2011/0167703 A1* | 7/2011 | Deros | 42/90 |
| 2011/0247255 A1* | 10/2011 | Ding et al. | 42/90 |
| 2012/0210624 A1* | 8/2012 | Schneider et al. | 42/90 |

\* cited by examiner

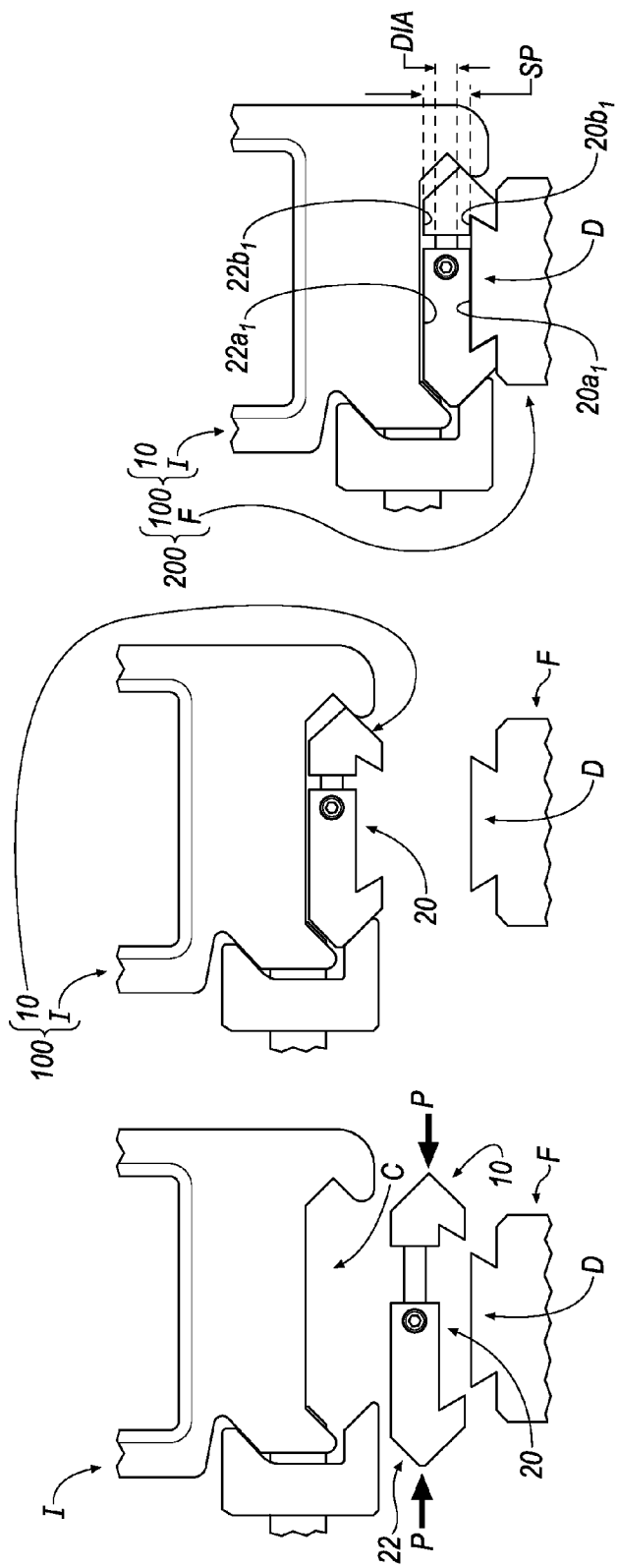

ADAPTER

CROSS-REFERENCE TO RELATED APPLICATIONS

This U.S. patent application claims priority under 35 U.S.C. §119(e) to U.S. Provisional Application 61/527,311, filed on Aug. 25, 2011. The disclosure of the prior application is considered part of the disclosure of this application and is hereby incorporated by reference in its entirety.

TECHNICAL FIELD

The disclosure relates to an adapter.

BACKGROUND

Adapters are known in the art. Improvements to adapters are continuously being sought in order to advance the art.

DESCRIPTION OF THE DRAWINGS

The disclosure will now be described, by way of example, with reference to the accompanying drawings, in which:

FIG. 3A is a front view of a portion of a firearm, a portion of a firearm implement and the adapter of FIG. 2B.

FIG. 3B is a front view of the firearm of FIG. 3A and a sub-assembly including the adapter joined to the firearm implement of FIG. 3A.

FIG. 3C is a front view of an assembly including the firearm of FIGS. 3A-3B joined to the sub-assembly of FIG. 3B.

DETAILED DESCRIPTION

The figures illustrate an exemplary implementation of an adapter. Based on the foregoing, it is to be generally understood that the nomenclature used herein is simply for convenience and the terms used to describe the invention should be given the broadest meaning by one of ordinary skill in the art.

Figure 1A:
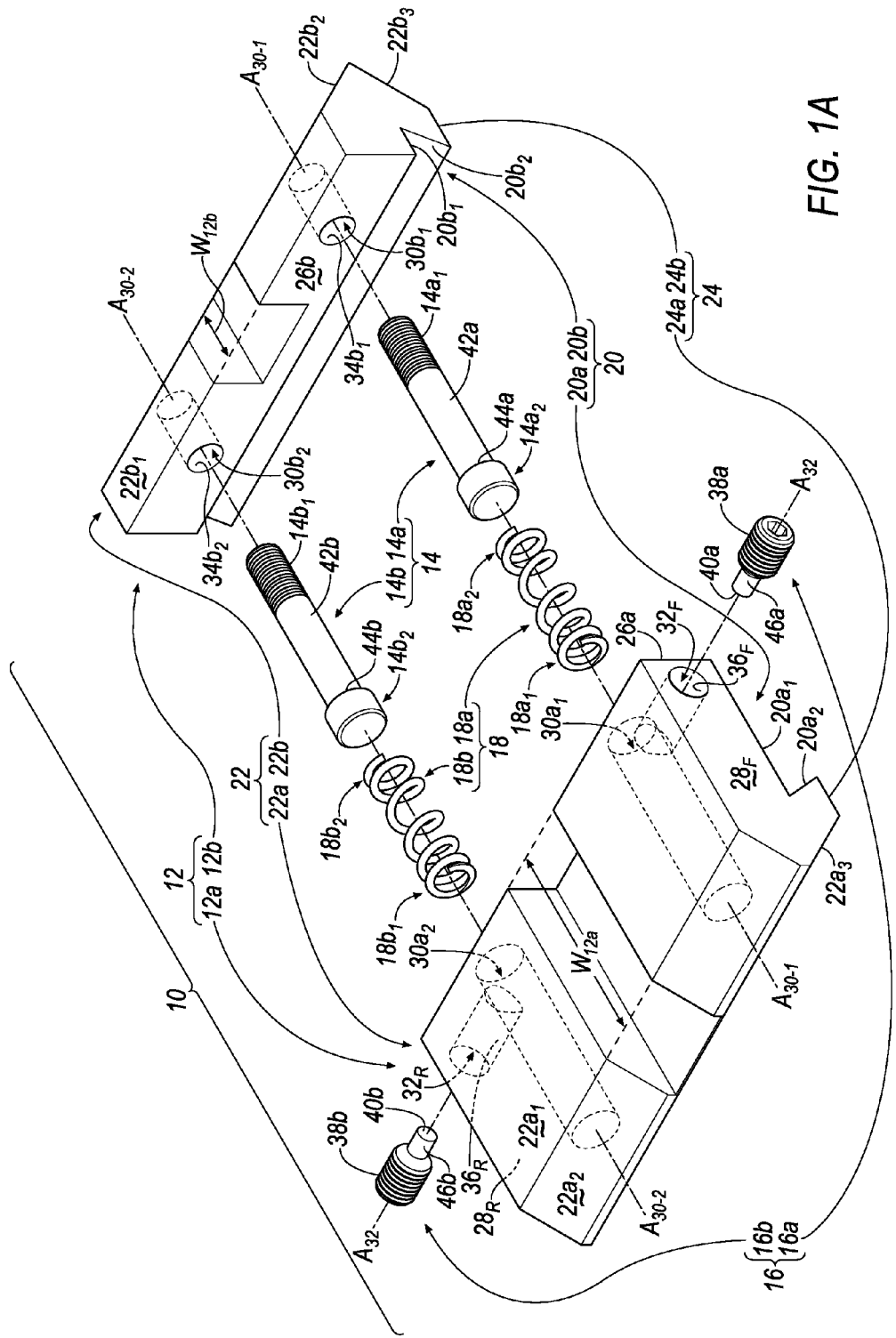
FIG. 1A is an exploded view of an exemplary adapter.
Figure 1B:
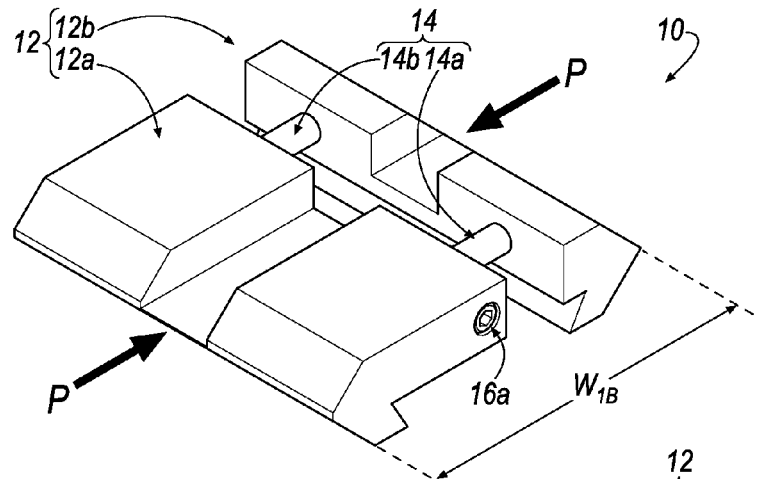
FIG. 1B is an assembled view of the adapter of FIG. 1A in an expanded orientation.
Figure 1C:
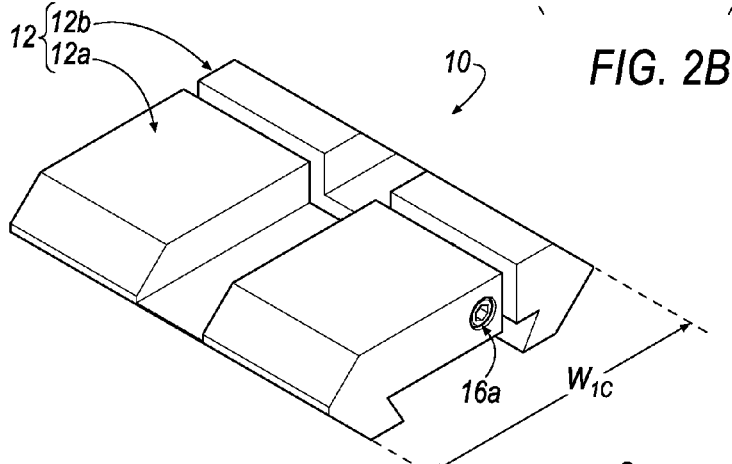
FIG. 1C is an assembled view of the adapter of FIG. 1A in a compressed orientation.

FIGS. 1A-1C illustrate an exemplary adapter shown generally at 10. The adapter 10 includes a plurality of interconnected components 12-18; accordingly, the adapter 10 may be alternatively referred to as an "adapter assembly." The interconnected components 12-18 that collectively form the adapter 10 may include, for example: a pair of bodies 12 including a major body 12a (or a first/"left," body 12a per the view of FIGS. 2B, 2C) and a minor body 12b (or a second/"right," body 12b per the view of FIGS. 2B, 2C), a pair of alignment pins 14 including a first alignment pin 14a and a second alignment pin 14b, a pair of set screws 16 including a first set screw 16a and a second set screw 16b, and a pair of biasing members 18 (e.g., a pair of springs) including a first biasing member 18a and a second biasing member 18b.

In an embodiment, each of the major body 12a and the minor body 12b include a channel surface portion 20a, 20b that collectively form a female mounting channel 20. The channel surface portion 20a, 20b of each of the major body 12a and the minor body 12b include a downwardly-facing, first channel surface $20a_1$, $20b_1$ and a side, inward-facing, second channel surface $20a_2$, $20b_2$.

In an embodiment, the downwardly-facing, first channel surface $20a_1$, $20b_1$ is non-perpendicularly connected to the side, inward-facing, second channel surface $20a_2$, $20b_2$. In an embodiment, the downwardly-facing, first channel surface $20a_1$, $20b_1$ may be connected to the side, inward-facing, second channel surface $20a_2$, $20b_2$ to form an acute angle, $\theta_{20a}$, $\theta_{20b}$ (see FIG. 2B) equal to approximately about 60°.

In an embodiment, the channel surface portion 20a, 20b of each of the major body 12a and the minor body 12b collectively define at least a portion of a geometry of the female mounting channel 20. In an embodiment, the geometry of the female mounting channel 20 may include a first type of geometry, such as, for example, a dovetail-shaped geometry in order to permit, for example, a corresponding dovetail shaped male portion, D (see, e.g., FIGS. 3A-3C), to be inserted into the female mounting channel 20.

In an embodiment, the major body 12a and the minor body 12b collectively define a male mounting surface 22. Each of the major body 12a and the minor body 12b include a male mounting surface portion 22a, 22b. The male mounting surface portion 22a, 22b of each of the major body 12a and the minor body 12b each include an upwardly-facing mounting surface $22a_1$, $22b_1$, a first outwardly-facing side surface, $22a_2$, $22b_2$, and a second outwardly-facing side surface $22a_3$, $22b_3$.

In an embodiment, the upwardly-facing mounting surface $22a_1$, $22b_1$ is connected to the first outwardly-facing side surface, $22a_2$, $22b_2$. In an embodiment, the upwardly-facing mounting surface $22a_1$, $22b_1$ may be connected to the first outwardly-facing side surface, $22a_2$, $22b_2$ at an obtuse angle, $\theta_{22a-1}$, $\theta_{22b-1}$ (see FIG. 2B) equal to approximately about 135°.

In an embodiment, the first outwardly-facing side surface, $22a_2$, $22b_2$ is connected to the second outwardly-facing side surface $22a_3$, $22b_3$. In an embodiment, the first outwardly-facing side surface, $22a_2$, $22b_2$ may be connected to the second outwardly-facing side surface $22a_3$, $22b_3$ at an acute angle, $\theta_{22a-2}$, $\theta_{22b-2}$ (see FIG. 2B) equal to approximately about 90°.

In an embodiment, the male mounting surface portion 22a, 22b of each of the major body 12a and the minor body 12b collectively define the male mounting surface 22 to have a second type of geometry that is different from the first type of geometry formed by the female channel 20. In an embodiment, the second type of geometry of the male mounting surface 22 may include, for example, a "Picatinny-style" or a "Weaver Style" geometry (i.e., a "Picatinny-style" or a "Weaver Style" geometry, which is typically associated with, for example, tactical weaponry, is different when compared to, e.g., a dovetail-shaped geometry, which is typically associated with, for example, a non-tactical weaponry, such as, for example, an airgun).

Figure 2B:
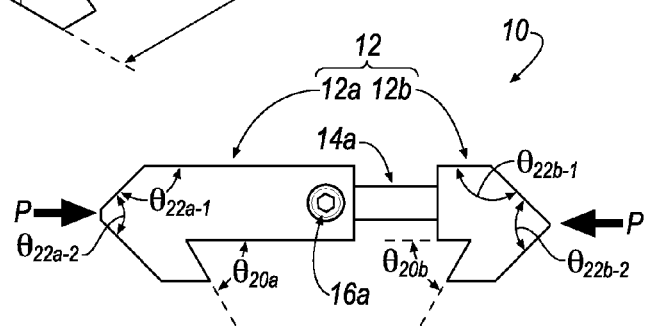
FIG. 2B is a front view of the adapter of FIG. 1B.
Figure 2C:
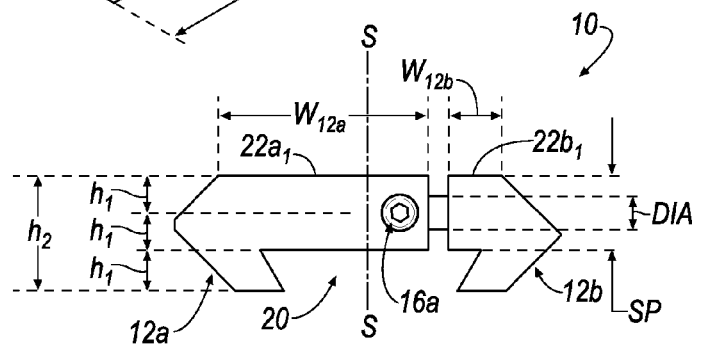
FIG. 2C is a front view of the adapter of FIG. 1C.
Figure 2A:
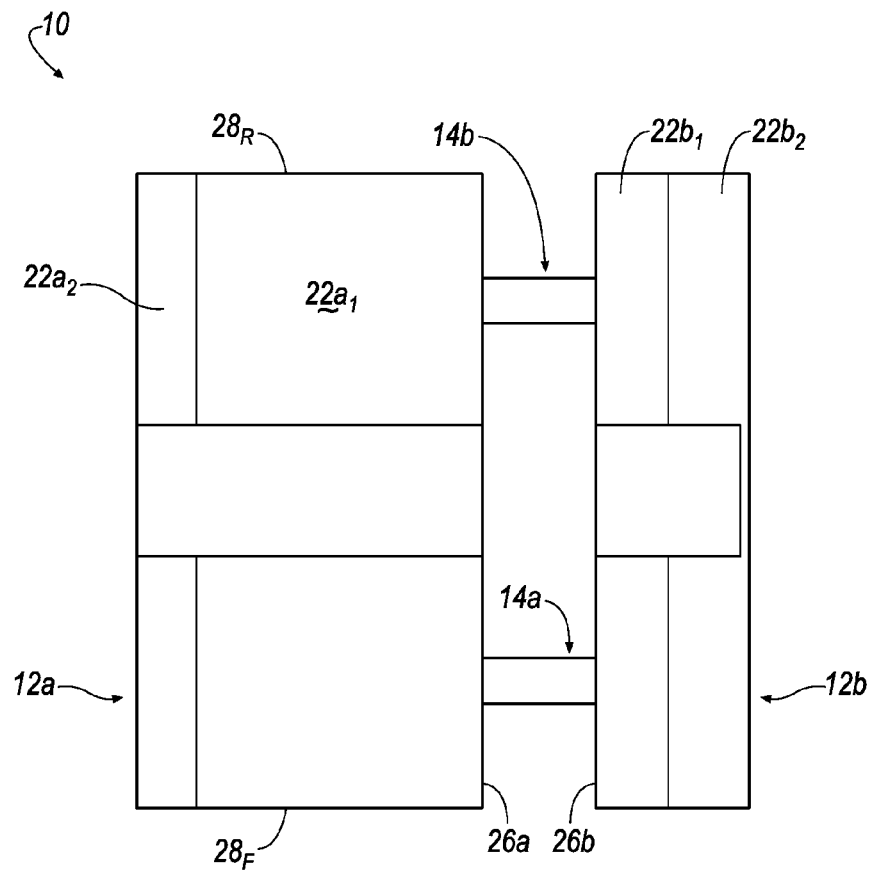
FIG. 2A is a top view of the adapter of FIG. 1B.
Figure 2D:
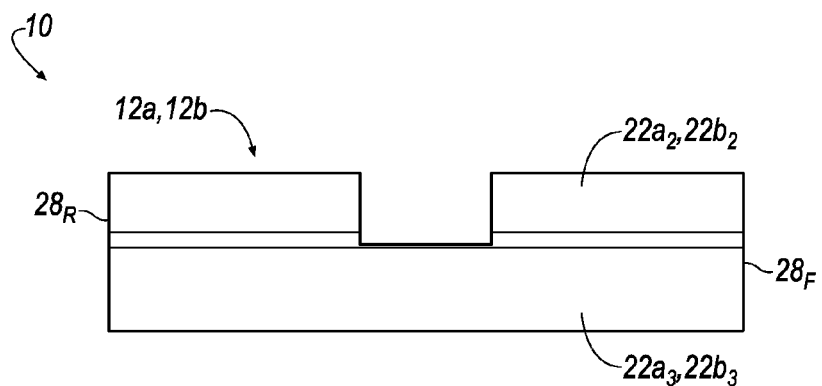
FIG. 2D is a side view of the adapter of FIG. 2B or 2C.

In an embodiment, the terms "major" and "minor" with respect to the major body 12a and the minor body 12b arise from a comparative size/geometry; for example, as seen in FIG. 2C, the upwardly-facing mounting surface $22a_1$ of the major body 12a includes a width dimension, $W_{12a}$ (see FIG.

2C) that is greater than a width dimension, $W_{12b}$ (see FIG. 2C) of the upwardly-facing mounting surface $22b_1$ of the minor body $12b$. Because of the differences in the width dimensions, $W_{12a}$, $W_{12b}$), the pair of bodies 12 comprising the adapter 10 may be said to have a non-symmetrical geometry (per a line of symmetry, S-S (see FIG. 2C), that evenly-divides the female mounting channel 20 formed by the pair of bodies 12).

Referring to FIG. 1, in an embodiment, the major body $12a$ and the minor body $12b$ each includes a downwardly-facing support surface portion $24a$, $24b$ that collectively define a support surface 24. The downwardly-facing support surface portion $24a$ of the major body $12a$ connects the side, inward-facing, second channel surface $20a_2$ to the second outwardly-facing side surface $22a_3$. The downwardly-facing support surface portion $24b$ of the minor body $12b$ connects the side, inward-facing, second channel surface $20b_2$ to the second outwardly-facing side surface $22b_3$. The downwardly-facing support portion $24a$, $24b$ of each of the major body $12b$ and the minor body $12b$ may be arranged substantially in parallel with the downwardly-facing, first channel surface $20a_1$, $20b_1$ and the upwardly-facing mounting surface $22a_1$, $22b_1$ of each of the major body $12a$ and the minor body $12b$.

Figure 5A:
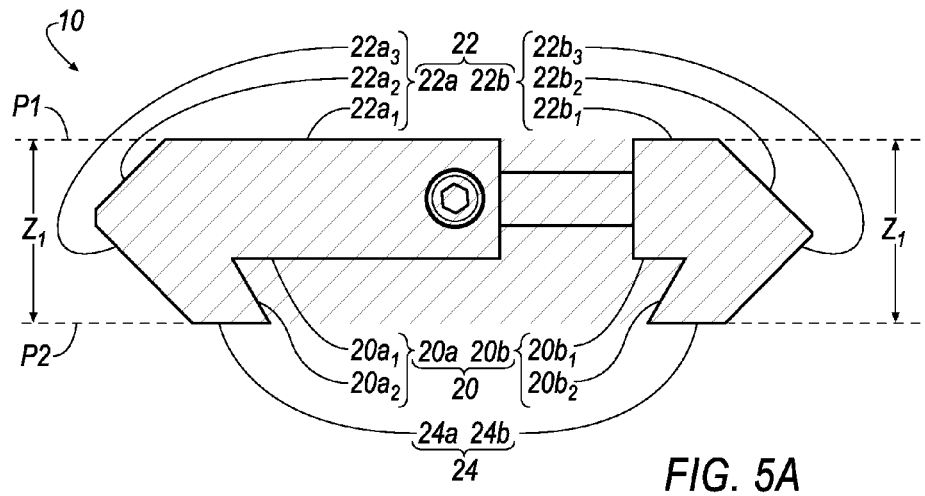
FIG. 5A is a front view of the adapter of FIG. 1B illustrating a first mounting zone.

Referring to FIG. 5A, a first mounting zone, $Z_1$, is defined by one or both of: (1) the mounting surfaces $22a_2$-$22a_3$, $22b_2$-$22b_3$ of the male mounting surface portions $22a$, $22b$ of the male mounting surface 22 of the adapter 10, and (2) a region (see hash marks in FIG. 5A) of the adapter 10 that is bounded by a first plane, P1, and a second plane, P2, that are arranged in parallel with one another. The first plane, P1, extends across the upwardly-facing mounting surfaces $22a_1$, $22b_1$ of the of the male mounting surface portions $22a$, $22b$ of the male mounting surface 22 of the adapter 10, and, the second plane, P2, extends across the downwardly-facing support surface portions $24a$, $24b$ of the support surface 24 of the adapter. As seen in originally-filed FIG. 3C, the male mounting surface portions $22a$, $22b$ directly contact and engage the implement, I.

Figure 5B:
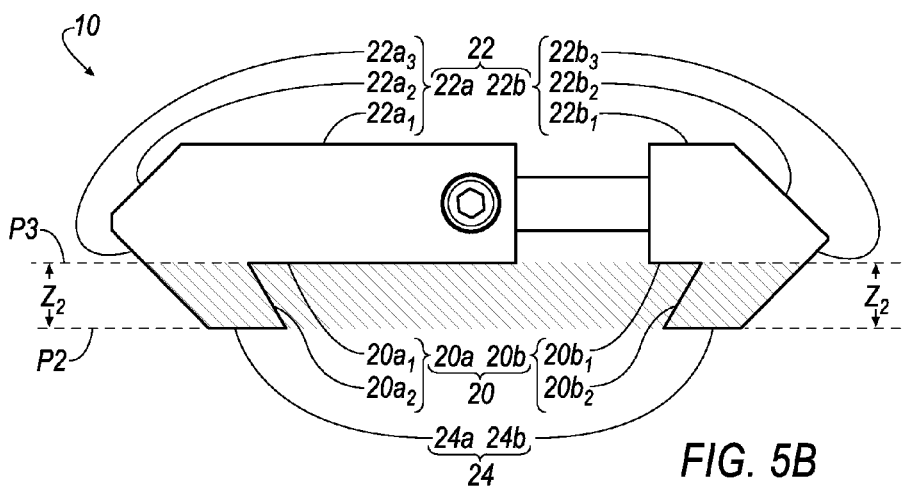
FIG. 5B is a front view of the adapter of FIG. 1B illustrating a second mounting zone.

Referring to FIG. 5B, a second mounting zone, $Z_2$, is defined by one or both of: (1) the mounting surfaces $20a_1$-$20a_2$, $20b_1$-$20b_2$ of the female channel surface portions $20a$, $20b$ of the female mounting channel 20 of the adapter 10, and (2) a region (see hash marks in FIG. 5B) of the adapter 10 that is bound by the second plane, P2, and a third plane, P3, that are arranged in parallel with one another. As described above, the second plane, P2, extends across the downwardly-facing support surface portions $24a$, $24b$ of the support surface 24 of the adapter 10. The third plane, P3, extends across the mounting surfaces $20a_1$, $20b_1$ of the female channel surface portions $20a$, $20b$ of the female mounting channel 20. As seen in originally-filed FIG. 3C, the female channel surface portions $20a$, $20b$ directly contact and engage the male portion, D, of the firearm, F.

Figure 5C:
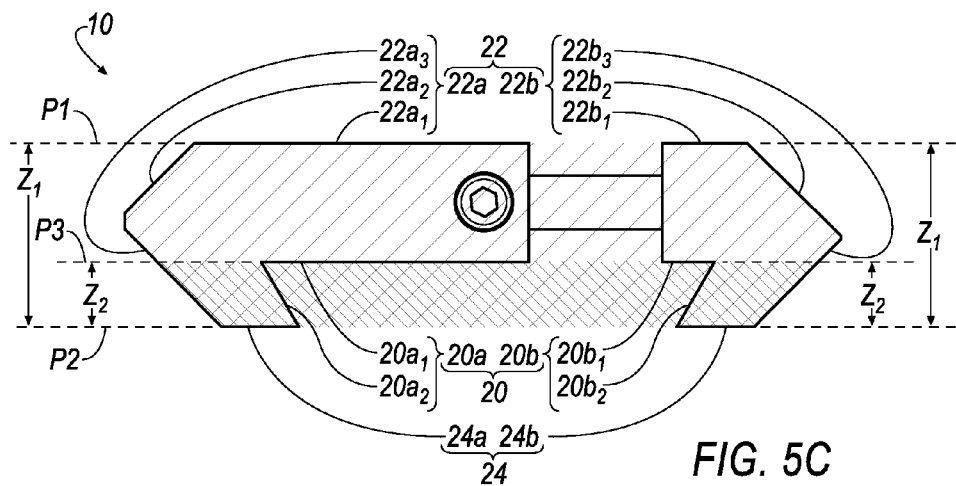
FIG. 5C is a front view of the adapter of FIG. 1B illustrating the first mounting zone of FIG. 5A overlapping the second mounting zone of FIG. 5B.

Referring to newly-added FIG. 5C, the first mounting zone, $Z_1$, overlaps the second mounting zone, $Z_2$. An embodiment of the adapter 10 includes an overlap of approximately one-third of the first mounting zone, $Z_1$, with all of the second mounting zone, $Z_2$.

In an embodiment, the major body $12a$ and the minor body $12b$ each includes an inward-facing, non-mounting surface $26a$, $26b$. The inward-facing, non-mounting surface $26a$ of the major body $12a$ connects the downwardly-facing, first channel surface $20a_1$ to the upwardly-facing mounting surface $22a_1$. The inward-facing, non-mounting surface $26b$ of the minor body $12b$ connects the downwardly-facing, first channel surface $20b_1$ to the upwardly-facing mounting surface $22b_1$. The downwardly-facing, non-mounting surface $26a$, $26b$ of each of the major body $12b$ and the minor body $12b$ may be arranged substantially perpendicularly with respect to the downwardly-facing, first channel surface $20a_1$, $20b_1$ and the upwardly-facing mounting surface $22a_1$, $22b_1$ of each of the major body $12a$ and the minor body $12b$.

In an embodiment, the major body $12a$ includes a forward-facing, non-mounting surface $28_F$ and a rearwardly-facing non-mounting surface $28_R$. Each of the forward-facing, non-mounting surface $28_F$ and the rearwardly-facing non-mounting surface $28_R$ of the major body $12a$ connects the downwardly-facing, first channel surface $20a_1$ to the upwardly-facing mounting surface $22a_1$. Each of the forward-facing, non-mounting surface $28_F$ and the rearwardly-facing non-mounting surface $28_R$ of the major body $12b$ may be arranged substantially perpendicularly with respect to the downwardly-facing, first channel surface $20a_1$ and the upwardly-facing mounting surface $22a_1$ of each of the major body $12a$. The minor body $12b$ also includes forward- and rearwardly-facing, non-mounting surfaces and connect the downwardly-facing, first channel surface $20b_1$ to the upwardly-facing mounting surface $22b_1$ in a substantially similar manner as described above with respect to the major body $12a$.

In an embodiment, the major body $12a$ and the minor body $12b$ each includes a first inward-facing passage $30a_1$, $30b_1$ and a second inward-facing passage $30a_2$, $30b_2$. The major body $12a$ also includes a forward-facing passage $32_F$ and a rearwardly-facing passage $32_R$.

When the major body $12a$ is joined to the minor body $12b$, the first inward-facing passage $30a_1$ of the major body $12a$ is axially aligned (along the axis, $A_{30\text{-}1}$-$A_{30\text{-}1}$) with the first inward-facing passage $30b_1$ of the minor body $12b$. Similarly, when the major body $12a$ is joined to the minor body $12b$, the second inward-facing passage $30a_2$ of the major body $12a$ is axially aligned (along the axis, $A_{30\text{-}2}$-$A_{30\text{-}2}$) with the second inward-facing passage $30b_2$ of the minor body $12b$. The axis $A_{30\text{-}1}$-$A_{30\text{-}1}$ is arranged substantially in parallel with the axis $A_{30\text{-}2}$-$A_{30\text{-}2}$.

The first inward-facing passage $30a_1$ of the major body $12a$ is in communication with and arranged substantially perpendicularly with respect to the forward-facing passage $32_F$. The second inward-facing passage $30a_2$ of the major body $12a$ is in communication with and arranged substantially perpendicularly with respect to the rearwardly-facing passage $32_R$.

The forward-facing passage $32_F$ and the rearwardly-facing passage $32_R$ are co-axially arranged upon an axis $A_{32}$-$A_{32}$. The axis $A_{32}$-$A_{32}$ traverses each of the axis $A_{30\text{-}1}$-$A_{30\text{-}1}$ and the axis $A_{30\text{-}2}$-$A_{30\text{-}2}$ in a substantially perpendicular fashion.

The first inward-facing passage $30a_1$ and the second inward-facing passage $30a_2$ of the major body $12a$ each extends from the inward-facing, non-mounting surface $26a$ and into the major body $12a$ at a distance equal to approximately about the width dimension, $W_{12a}$, of the upwardly-facing mounting surface $22a_1$. The first inward-facing passage $30b_1$ and the second inward-facing passage $30b_2$ of the minor body $12b$ each extends from the inward-facing, non-mounting surface $26b$ and into the minor body $12b$ at a distance equal to approximately about the width dimension, $W_{12b}$, of the upwardly-facing mounting surface $22b_1$.

The forward-facing passage $32_F$ extends from the forward-facing, non-mounting surface $28_F$ and into the major body $12a$ such that the forward-facing passage $32_F$ terminates at and is in communication with the first inward-facing passage $30a_1$ of the major body $12a$. The rearwardly-facing passage $32_R$ extends from the rearwardly-facing, non-mounting surface $28_R$ and into the major body $12a$ such that the rearwardly-facing passage $32_R$ terminates at and is in communication with the second inward-facing passage $30a_2$ of the major body $12a$.

In an embodiment, each of the first inward-facing passage $30b_1$ and the second inward-facing passage $30b_2$ of the minor body $12b$ may be formed, respectively, by a threaded surface $34_{b1}$, $34_{b2}$. In an embodiment, each of the forward-facing passage $32_F$ and the rearwardly-facing passage $32_R$ of the major body $12a$ may be formed, respectively, by a threaded surface $36_F$, $36_R$.

Referring to FIG. 1A, an embodiment of a method for assembling the adapter 10 is described. A threaded end $14a_1$ of the first alignment pin $14a$ may threadingly-engage and be connected to the threaded surface $34_{b1}$ of the first inward-facing passage $30b_1$ of the minor body $12b$. A head end $14a_2$ of the first alignment pin $14a$ (i.e., the threaded end $14a_1$ may be considered a first end of the first alignment pin $14a$, and, the head end $14a_2$ may be considered a second end of the first alignment pin $14a$) may extend out of the first inward-facing passage $30b_1$ of the minor body $12b$ and beyond the inward-facing, non-mounting surface $26b$ of the minor body $12b$.

A threaded end $14b_1$ of the second alignment pin $14b$ may threadingly-engage and be connected to the threaded surface $34_{b2}$ of the second inward-facing passage $30b_2$ of the minor body $12b$. A head end $14b_2$ of the second alignment pin $14b$ (i.e., the threaded end $14b_1$ may be considered a first end of the second alignment pin $14b$, and, the head end $14b_2$ may be considered a second end of the second alignment pin $14b$) may extend out of the second inward-facing passage $30b_2$ of the minor body $12b$ and beyond the inward-facing, non-mounting surface $26b$ of the minor body $12b$.

A first end $18a_1$ of the first biasing member $18a$ is inserted into the first inward-facing passage $30a_1$ of the major body $12a$. When in a non-compressed, unbiased orientation, a second end $18a_2$ of the first biasing member $18a$ may extend out of the first inward-facing passage $30a_1$ and beyond the inward-facing, non-mounting surface $26a$ of the major body $12a$.

A first end $18b_1$ of the second biasing member $18b$ is inserted into the second inward-facing passage $30a_2$ of the major body $12a$. When in a non-compressed, unbiased orientation, a second end $18b_2$ of the second biasing member $18b$ may extend out of the second inward-facing passage $30a_2$ and beyond the inward-facing, non-mounting surface $26a$ of the major body $12a$.

The axis $A_{30-1}$-$A_{30-1}$ and the axis $A_{30-2}$-$A_{30-2}$ may be aligned, and, subsequently, the major body $12a$ and the minor body $12b$ may be arranged closer to one another in order to cause: (1) the first alignment pin $14a$ to contact the second end $18a_2$ of the first biasing member $18a$, and (2) the second alignment pin $14b$ to contact the second end $18b_2$ of the second biasing member $18b$. Upon the first and second alignment pins $14a$, $14b$ contacting the first and second biasing members $18a$, $18b$ as described above, further movement of the major body $12a$ and the minor body $12b$ closer to one another results in: (1) the head end $14a_2$ of the first alignment pin $14a$ being inserted into the first inward-facing passage $30a_1$ of the major body $12a$ and causing a compressive force to be applied to the second end $18a_2$ of the first biasing member $18a$, thereby compressing and biasing the first biasing member $18a$ within the first inward-facing passage $30a_1$ of the major body $12a$, and (2) the head end $14b_2$ of the second alignment pin $14b$ being inserted into the second inward-facing passage $30a_2$ of the major body $12a$ and causing a compressive force to be applied to the second end $18b_2$ of the second biasing member $18b$, thereby compressing and biasing the second biasing member $18b$ within the second inward-facing passage $30a_7$ of the major body $12a$.

Then, the first set screw $16a$ is inserted into the forward-facing passage $32_F$ of the major body $12a$. The first set screw $16a$ includes a threaded outer surface $38a$ that threadingly-engages the threaded surface $36_F$ of the forward-facing passage $32_F$ of the major body $12a$. A distal end $40a$ of the first set screw $16a$ engages a side outer body surface $42a$ of the first alignment pin $14a$.

Then, the second set screw $16b$ is inserted into the rearwardly-facing passage $32_R$ of the major body $12a$. The second set screw $16b$ includes a threaded outer surface $38b$ that threadingly-engages the threaded surface $36_R$ of the rearwardly-facing passage $32_R$ of the major body $12a$. A distal end $40b$ of the second set screw $16b$ engages an outer body surface $42b$ of the second alignment pin $14b$.

After connecting the first and second set screws $16a$, $16b$ to the major body $12a$, a biasing force that resulted in the further movement of the major body $12a$ and the minor body $12b$ closer to one another (which causes the above-described "further compressive force" applied to the second end $18a_2$ of the first biasing member $18a$ and the second end $18b_2$ of the second biasing member $18b$ thereby compressing and biasing the first biasing member $18a$ within the first inward-facing passage $30a_1$ and compressing and biasing the second biasing member $18b$ within the second inward-facing passage $30a_2$ of the major body $12a$) may be released. The release of the biasing force permits the first and second biasing members $18a$, $18b$ to expand such that a ledge surface $44a$, $44b$ of the head end $14a_2$, $14b_2$ of each of the first and second alignment pins $14a$, $14b$ to engage a side outer body surface $46a$, $46b$ near the distal end $40a$, $40b$ of each of the first and second set screws $16a$, $16b$, which results in the assembly, being arranged in a connected, but expanded orientation as seen FIGS. 1B, 2B.

Referring to FIGS. 1B and 2B, a user may manually apply a biasing force, P (by, e.g., pinching the adapter 10), in order to change a spatial orientation of the adapter 10 from an expanded orientation (see, e.g., FIGS. 1B, 2B) to a compressed orientation (see, e.g., FIG. 1C, 2C). The expanded orientation of the adapter 10 results in the adapter 10 having a greater width, $W_{1B}$ (see, e.g., FIG. 1B), when compared to that of a width, $W_{1C}$ (see, e.g., FIG. 2B), of the adapter 10 when arranged in the compressed orientation. Upon releasing the biasing (e.g., pinching) force, P, the pair of biasing members 18 may expand and return the adapter 10 from the compressed orientation (of FIGS. 1C, 2C) back to the expanded orientation (of FIGS. 1B, 2B).

Figure 4:
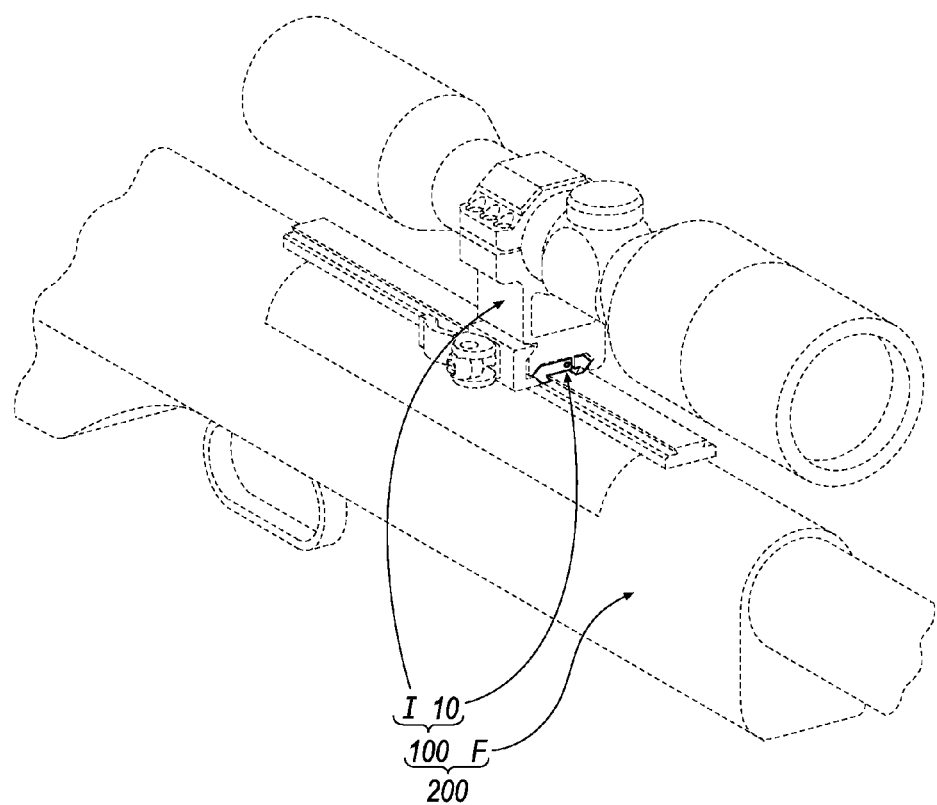
FIG. 4 is a perspective view of the assembly of FIG. 3C.

Referring to FIGS. 3A-4, the adapter 10 may be disposed within a female mounting channel, C (see FIG. 3A), of an implement, I. The female mounting channel, C, of the implement may include a "Picatinny-style" or a "Weaver Style" geometry that corresponds to, for example, the second type of geometry of the male mounting surface 22 of the adapter 10. Because the adapter 10 includes an adjustable width ranging between the expanded width, $W_{1B}$, and the compressed width, $W_{1C}$, upon releasing the biasing force, P, expansion of the pair of biasing members 18, may result in the adapter 10 wedging itself within the female mounting channel, C, and "self-lock" to the implement, I, as seen in, for example, FIG. 3B.

Referring to FIG. 3A, when use of the adapter 10 is desired, a user may apply the biasing force, P, to the adapter 10 in order to reduce the width from the expanded width, $W_{1B}$ (see, e.g., FIG. 3A) to approximately about the compressed width, $W_{1C}$ (see, e.g., FIG. 3B). Then, as seen in FIG. 3B, after at least partially disposing the adapter 10 within the female mount channel, C, the user may release the biasing force, P, thereby permitting the adapter 10 expand from the expanded width, $W_{1B}$, to a width that is greater than but equal to approximately about the compressed width, $W_{1C}$, in order to wedge itself within the female mounting channel, C, and "self-lock" to the implement, I. As seen in FIG. 3B, the adapter 10 and the implement, I, may be referred to as a sub-assembly 100 upon connecting the adapter 10 to the implement, I.

Referring to FIGS. 3C-4, the sub-assembly 100 is connected to a male portion, D, of a firearm, F, for forming an assembly 200 by inserting the male portion, D, of the firearm, F, into the female mounting channel 20 of the adapter 10. The male portion, D, may be a mounting rail of the firearm, F. The mounting rail, D, of the firearm, F, may include a dovetail-shaped geometry that corresponds to, for example, the first type of geometry of the female mounting channel 20 of the adapter 10.

In view of an embodiment of the invention shown at FIGS. 3A-4, the adapter 10 may be characterized as a "dovetail-to-Picatinny" adapter that permits, for example, a user to mount an implement, I, having a female mounting channel, C, that does not correspond to the geometry of a male portion, D, extending from the firearm, F. Although the adapter 10 includes a "dovetail-to-Picatinny" geometry, the adapter 10 is not limited to the above-described embodiment and may include, for example, different geometries. Further, in an embodiment, the adapter 10 is not limited to a "dovetail-to-Picatinny" geometry and may be modified, as desired to include, for example, a reversal of the geometry in order to provide a "Picatinny-to-dovetail" geometry.

Further, the adapter 10 may be characterized as having a "low profile." Because the adapter 10 is an intervening element (located between and connecting the firearm, F, to the implement, I), the adapter 10 may vertically elevate or increase the spacing between the firearm, F, and the implement, I. If, for example, the implement, I, is an aiming scope, an increased vertical spacing or elevation of the scope, I, away from the firearm, F, may upset a shooter's natural aiming tendency, thereby inhibiting a user from placing, for example, his/her cheekbone adjacent to/proximate the barrel portion (see FIG. 4) of the firearm, F.

Accordingly, in view of what is stated above, the adapter 10 is designed to include a "low profile." The "low profile" may arise from a minimized vertical dimension that may be defined by or referenced from one or more dimensions of the adapter 10; in an embodiment, the one or more dimensions may be one or more vertical dimensions of the adapter 10. Exemplary vertical dimensions that may be utilized to describe/define the "low profile" nature of the adapter 10 are shown, for example, at reference numerals SP, DIA, $h_1$, $h_2$, in FIGS. 2C and 3C.

In an embodiment, the adapter 10 may include a minimized or reduced vertical spacing, SP. The minimized or reduced vertical spacing, SP, is located and extends between the downwardly-facing, first channel surface $20a_1$, $20b_1$ and the upwardly-facing mounting surface $22a_1$, $22b_1$. In an embodiment, the minimized or reduced vertical spacing, SP, may be equal to approximately about 4 mm. The minimized or reduced vertical spacing, SP, may be a vertical dimension that may be utilized (alone) to define the "low profile" nature of the adapter 10.

Although the minimized or reduced vertical spacing, SP, is utilized to describe the "low profile" adapter 10, one or more other geometric dimensions may alternatively be used in order to describe a "low profile" arrangement of the adapter 10. For example, referring to FIG. 2C, the female mounting channel 20 may be described to include a vertical height, $h_1$, and an overall vertical height, $h_2$, of the adapter 10. The overall vertical height, $h_2$, of the adapter 10 may be less than or equal to approximately about three times the value of the vertical height, $h_1$, of the female mounting channel 20; accordingly, it may be said that the "low profile" nature of the adapter 10 may be described by referencing a "vertical dimension ratio" of the overall vertical height, $h_2$, of the adapter 10 to the vertical height, $h_1$, of the female mounting channel 20.

In an embodiment, the vertical height, $h_1$, of the female mounting channel 20 may be equal to approximately about 2 mm, and, the overall vertical height, $h_2$, of the adapter 10 may be equal to approximately about 6 mm (i.e., the "vertical dimension ratio" may be equal to approximately about a 3-to-1 [3:1] ratio). Additionally, as seen in FIG. 2C, the minimized or reduced vertical spacing, SP, may be equal to or less than approximately about two times the value of the height, $h_1$ (i.e., a "vertical dimension ratio" may alternatively be described to include a 2-to-1 [2:1] ratio when comparing the dimensions of the minimized or reduced vertical spacing, SP, and the vertical height, $h_1$, of the female mounting channel 20).

Although the "low profile" arrangement of the adapater 10 is described above by the geometric dimensions related to one or more of: (1) the minimized or reduced vertical spacing, SP, (2) the height, $h_1$, of the female mounting channel 20, and/or (3) the overall height, $h_2$, of the adapter 10, the "low profile" arrangement of the adapater 10 may be described by other geometric dimensions. For example, the minimized or reduced vertical spacing, SP, may include a dimension that may be equal to but slightly greater than approximately about a dimension (see, e.g., a diameter, DIA, in FIG. 2C) of one of the passages $30a_1$, $30b_1$, $30a_2$, $30b_2$, $32_F$, $32_R$. In an embodiment, one or more of the passages $30a_1$, $30b_1$, $30a_2$, $30b_2$, $32_F$, $32_R$ may be formed to include a dimension, DIA, that is equal to approximately about, for example, 3.000 mm; accordingly, in an embodiment, the minimized or reduced vertical spacing, SP, may be formed to include a dimension that is equal to approximately about a dimension ranging between approximately about, for example, 3.001 mm and 4.000 mm.

Thus, by designing the adapter 10 to include a "low profile," the adapter 10 may not otherwise upset a shooter's natural aiming tendency and still permit a user to place, for example, his/her cheekbone adjacent to/proximate the barrel portion (see FIG. 4) of the firearm, F. Additionally, the above-described dimensions (i.e., 2 mm, 3.000 mm, 3.001 mm, 4 mm, 6 mm) are exemplary dimensions and should not be utilized to limit the scope of the claimed invention; that is, the adapter 10 may be designed to include any dimension not mentioned in the written described, and, further, the adapter 10 is not limited to any specific dimension or line ratio arising from the illustrated embodiments shown in the Figures.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An apparatus, comprising:
    an adapter including a first body and a second body, wherein a lower surface profile of the first body and the second body cooperate to form a first geometric mounting profile, wherein the first geometric mounting profile forms a channel sized to receive a mounting rail, wherein all lateral outer side surfaces of an upper surface profile of the first body and the second body cooperate to form a second geometric mounting profile, wherein the second geometric mounting profile forms a rail body sized to be received within a channel formed by an implement, wherein the first geometric mounting profile is different from the second geometric mounting profile, wherein the channel formed by the first geometric mounting profile and the mounting rail include corresponding dovetail profiles, wherein the rail body formed by the second geometric mounting profile and the channel formed by the implement include corresponding picatinny profiles, wherein the first geometric mounting profile includes
  a vertical mounting profile dimension, wherein the adapter includes
  a vertical adapter dimension, wherein the vertical adapter dimension is approximately less than or equal to about three times the vertical mounting profile dimension,
wherein a first plane extends across an upper surface portion of the upper surface profile of the first body and the second body, wherein a second plane extends across a first surface portion of the lower surface profile of the first body and the second body, wherein a third plane extends across a second surface portion of the lower surface profile of the first body and the second body,
wherein a first mounting zone of the adapter is bounded by the first plane and the second plane, wherein a second mounting zone of the adapter is bounded by the second plane and the third plane,
wherein the first mounting zone overlaps the second mounting zone.

2. The apparatus according to claim 1, wherein the vertical adapter dimension is equal to about 6 mm, wherein the vertical mounting profile dimension is equal about 2 mm.

3. An apparatus, comprising:
  an adapter including a first body and a second body, wherein a lower surface profile of the first body and the second body cooperate to form a first geometric mounting profile, wherein the first geometric mounting profile forms a channel sized to receive a mounting rail, wherein all lateral outer side surfaces and an upper surface portion of an upper surface profile of the first body and the second body cooperate to form a second geometric mounting profile, wherein the second geometric mounting profile forms a rail body sized to be received within a channel formed by an implement, wherein the first geometric mounting profile is different from the second geometric mounting profile, wherein the channel formed by the first geometric mounting profile and the mounting rail include corresponding dovetail profiles, wherein the rail body formed by the second geometric mounting profile and the channel formed by the implement include corresponding picatinny profiles, wherein the first geometric mounting profile includes
    a vertical body dimension bound by a downwardly-facing, first channel surface and an upwardly-facing mounting surface, wherein the first geometric profile includes
    a vertical mounting profile dimension, wherein the vertical body dimension is approximately less than or equal to about two times the vertical mounting profile dimension,
  wherein a first plane extends across an upper surface portion of the upper surface profile of the first body and the second body, wherein a second plane extends across a first surface portion of the lower surface profile of the first body and the second body, wherein a third plane extends across a second surface portion of the lower surface profile of the first body and the second body,
  wherein a first mounting zone of the adapter is bounded by the first plane and the second plane, wherein a second mounting zone of the adapter is bounded by the second plane and the third plane,
  wherein the first mounting zone overlaps the second mounting zone.

4. The apparatus according to claim 3, wherein the vertical body dimension is equal to about 4 mm, wherein the vertical mounting profile dimension is equal to about 2 mm.

5. An apparatus, comprising:
  an adapter including a first body and a second body, wherein a lower surface profile of the first body and the second body cooperate to form a first geometric mounting profile, wherein the first geometric mounting profile forms a channel sized to receive a mounting rail, wherein all lateral outer side surfaces and an upper surface portion of an upper surface profile of the first body and the second body cooperate to form a second geometric mounting profile, wherein the second geometric mounting profile forms a rail body sized to be received within a channel formed by an implement, wherein the first geometric mounting profile is different from the second geometric mounting profile, wherein the channel formed by the first geometric mounting profile and the mounting rail include corresponding dovetail profiles, wherein the rail body formed by the second geometric mounting profile and the channel formed by the implement include corresponding picatinny profiles, wherein each of the first body and the second body forms at least one bore, wherein the first geometric mounting profile includes
    a vertical body dimension bound by a downwardly-facing, first channel surface and an upwardly-facing mounting surface, wherein the at least one bore includes
    a bore dimension, wherein the vertical body dimension is about equal to but slightly greater than the bore dimension,
  wherein a first plane extends across an upper surface portion of the upper surface profile of the first body and the second body, wherein a second plane extends across a first surface portion of the lower surface profile of the first body and the second body, wherein a third plane extends across a second surface portion of the lower surface profile of the first body and the second body,
  wherein a first mounting zone of the adapter is bounded by the first plane and the second plane, wherein a second mounting zone of the adapter is bounded by the second plane and the third plane,
  wherein the first mounting zone overlaps the second mounting zone.

6. The apparatus according to claim 5, wherein the vertical body dimension is equal to about a dimension ranging between about 3.001 mm and 4.000 mm, wherein the bore dimension is equal to about 3.000 mm.

7. The apparatus according to claim 1, wherein each of the first body and the second body respectively form at least one first aligned bore that receives
  a first fastener that connects the first body to the second body, and
  a spring that biases the first body and the second body away from one another.

8. The apparatus according to claim 7, wherein the first body forms at least one second bore, wherein the at least one second bore intersects with and is in communication with the at least one first bore formed in the first body.

9. The apparatus according to claim 8, wherein the at least one second bore is substantially perpendicular with respect to the at least one first bore formed in the first body.

10. The apparatus according to claim 8, wherein the at least one second bore receives
a set screw, wherein an end of the set screw is arranged within the at least one first bore formed in the first body, wherein the end of the set screw contacts a side surface of the first fastener.

11. The apparatus according to claim 1, wherein the mounting rail extends from a firearm.

12. The apparatus according to claim 3, wherein the mounting rail extends from a firearm.

13. The apparatus according to claim 5, wherein the mounting rail extends from a firearm.

14. The apparatus according to claim 1, further comprising
means for adjusting a width of the adapter for wedging and self-locking the adapter within a female mounting channel of an implement, wherein the means is disposed between the first body and the second body.

15. The apparatus according to claim 1, further comprising
a pair of biasing members for adjusting a width of the adapter for wedging and self-locking the adapter within a female mounting channel of an implement, wherein the pair of biasing members are disposed between the first body and the second body.

16. The apparatus according to claim 1, wherein an upwardly-facing mounting surface of the first body includes a first width dimension, wherein an upwardly-facing mounting surface of the first body includes a second width dimension, wherein the first width dimension is greater than the second width dimension to define the adapter to have a non-symmetrical geometry.

17. The apparatus according to claim 3, further comprising
means for adjusting a width of the adapter for wedging and self-locking the adapter within a female mounting channel of an implement, wherein the means is disposed between the first body and the second body.

18. The apparatus according to claim 3, further comprising
a pair of biasing members for adjusting a width of the adapter for wedging and self-locking the adapter within a female mounting channel of an implement, wherein the pair of biasing members are disposed between the first body and the second body.

19. The apparatus according to claim 3, wherein an upwardly-facing mounting surface of the first body includes a first width dimension, wherein an upwardly-facing mounting surface of the first body includes a second width dimension, wherein the first width dimension is greater than the second width dimension to define the adapter to have a non-symmetrical geometry.

20. The apparatus according to claim 5, further comprising
means for adjusting a width of the adapter for wedging and self-locking the adapter within a female mounting channel of an implement, wherein the means is disposed between the first body and the second body.

21. The apparatus according to claim 5, further comprising
a pair of biasing members for adjusting a width of the adapter for wedging and self-locking the adapter within a female mounting channel of an implement, wherein the pair of biasing members are disposed between the first body and the second body.

22. The apparatus according to claim 5, wherein an upwardly-facing mounting surface of the first body includes a first width dimension, wherein an upwardly-facing mounting surface of the first body includes a second width dimension, wherein the first width dimension is greater than the second width dimension to define the adapter to have a non-symmetrical geometry.

23. The apparatus according to claim 1, wherein the first plane is parallel to the second plane, wherein the second plane is parallel to the third plane.

24. The apparatus according to claim 1, wherein all of the lateral outer side surfaces of the first body portion and the second body portion are located between the first plane and the second plane, wherein all inner female mounting channel surfaces of the first body portion and the second body portion are located between the second plane and the third plane.

25. The apparatus according to claim 1, wherein approximately one-third of the first mounting zone overlaps with all of the second mounting zone.

26. The apparatus according to claim 3, wherein the first plane is parallel to the second plane, wherein the second plane is parallel to the third plane.

27. The apparatus according to claim 3, wherein all of the lateral outer side surfaces of the first body portion and the second body portion are located between the first plane and the second plane, wherein all inner female mounting channel surfaces of the first body portion and the second body portion are located between the second plane and the third plane.

28. The apparatus according to claim 3, wherein approximately one-third of the first mounting zone overlaps with all of the second mounting zone.

29. The apparatus according to claim 5, wherein the first plane is parallel to the second plane, wherein the second plane is parallel to the third plane.

30. The apparatus according to claim 5, wherein all of the lateral outer side surfaces of the first body portion and the second body portion are located between the first plane and the second plane, wherein all inner female mounting channel surfaces of the first body portion and the second body portion are located between the second plane and the third plane.

31. The apparatus according to claim 5, wherein approximately one-third of the first mounting zone overlaps with all of the second mounting zone.

* * * * *